Aug. 17, 1926.

W. A. ECKERT 1,596,164

SAFETY DEVICE FOR PRESSES, ETC

Filed March 12, 1923   5 Sheets-Sheet 1

Inventor
William A. Eckert
by Geyer & Popp
Attorneys

Aug. 17, 1926.

W. A. ECKERT 1,596,164

SAFETY DEVICE FOR PRESSES, ETC

Filed March 12, 1923    5 Sheets-Sheet 3

Inventor
William A. Eckert
by Geyer & Pohle
Attorneys

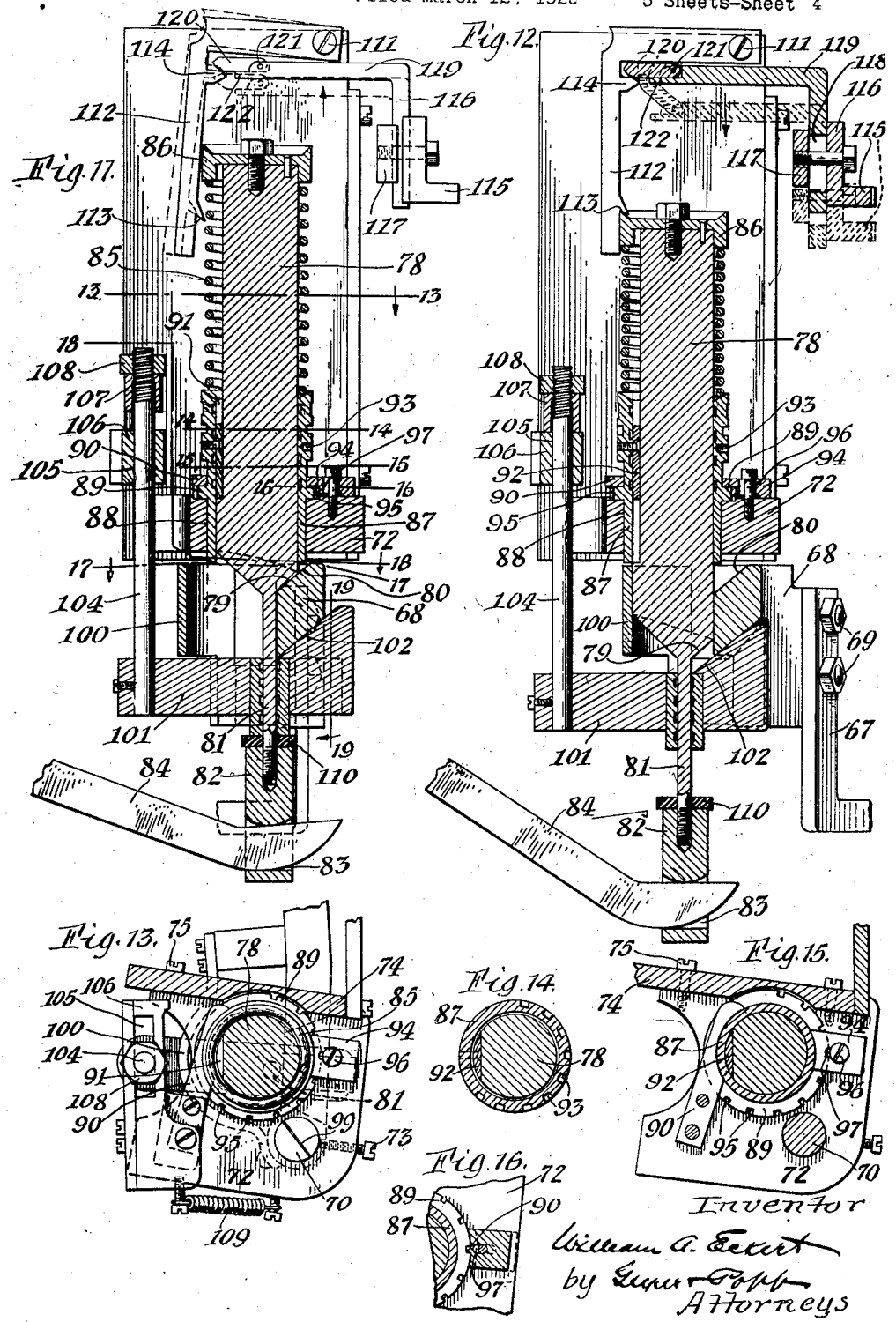

Aug. 17, 1926.
W. A. ECKERT
SAFETY DEVICE FOR PRESSES, ETC
Filed March 12, 1923    5 Sheets-Sheet 5
1,596,164
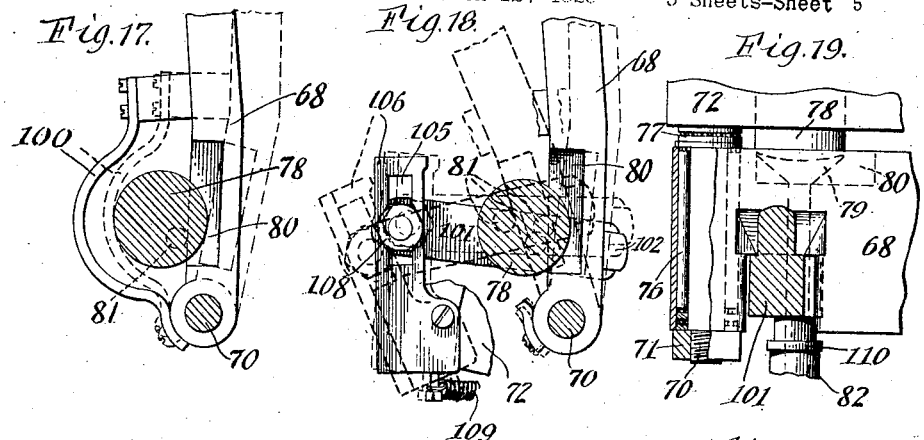
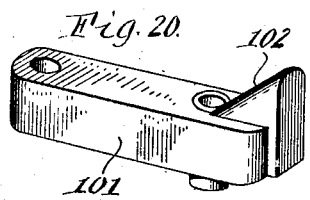
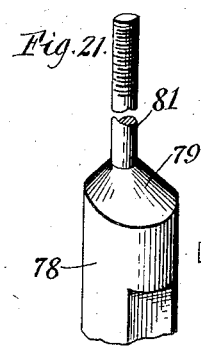
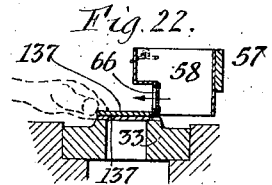
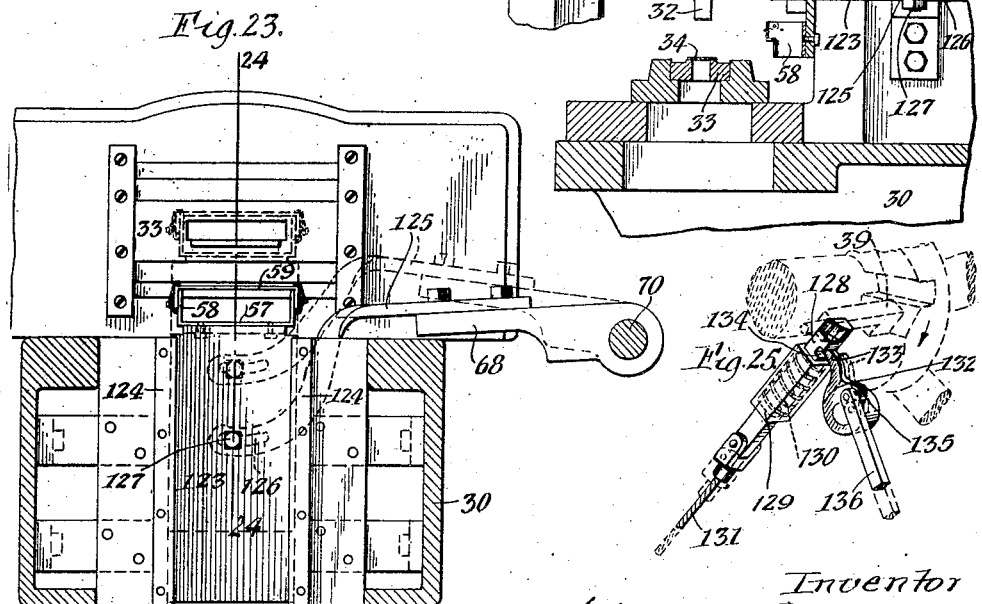

Patented Aug. 17, 1926.

1,596,164

UNITED STATES PATENT OFFICE.

WILLIAM A. ECKERT, OF BUFFALO, NEW YORK.

SAFETY DEVICE FOR PRESSES, ETC.

Application filed March 12, 1923. Serial No. 624,361.

This invention relates to a safety device for machinery intended more particularly for use in presses in which a punch moves toward and from a die for forming or perforating sheet metal between these tools.

As is well known, operators very often have their fingers and hands injured by being caught between a punch and die when these two members come together, and it is the purpose of this invention to provide an efficient and superior safety device for presses and other machines of this general character which will positively prevent the machine from being operated unless the space or path in which the punch moves toward and from the die is clear, and which is so constructed that the same is applicable to various forms of presses, and which can be readily adjusted so as to work in conjunction with stamping or punching tools of various widths and sizes.

Figure 1:
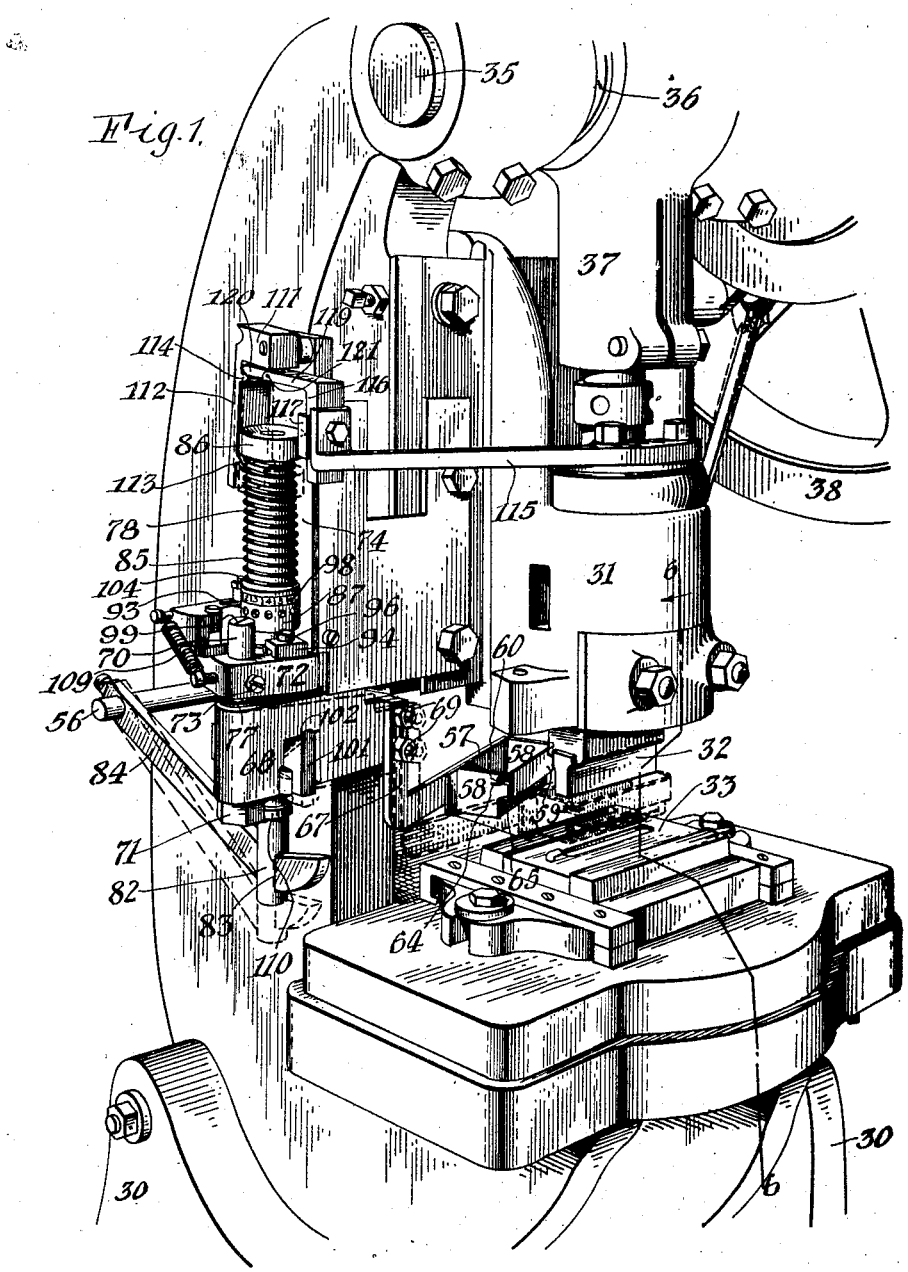
Figure 2:
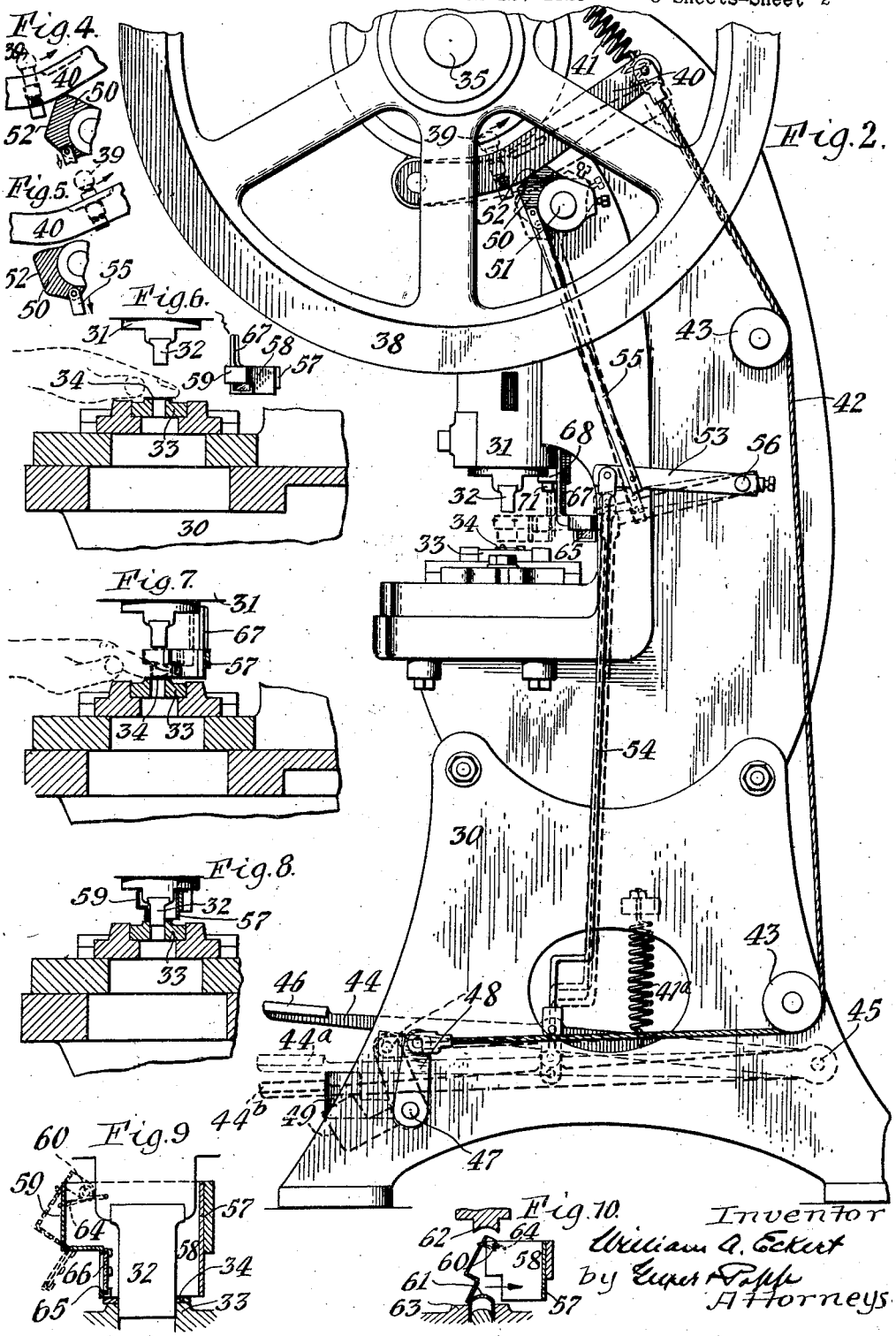
Figure 3:
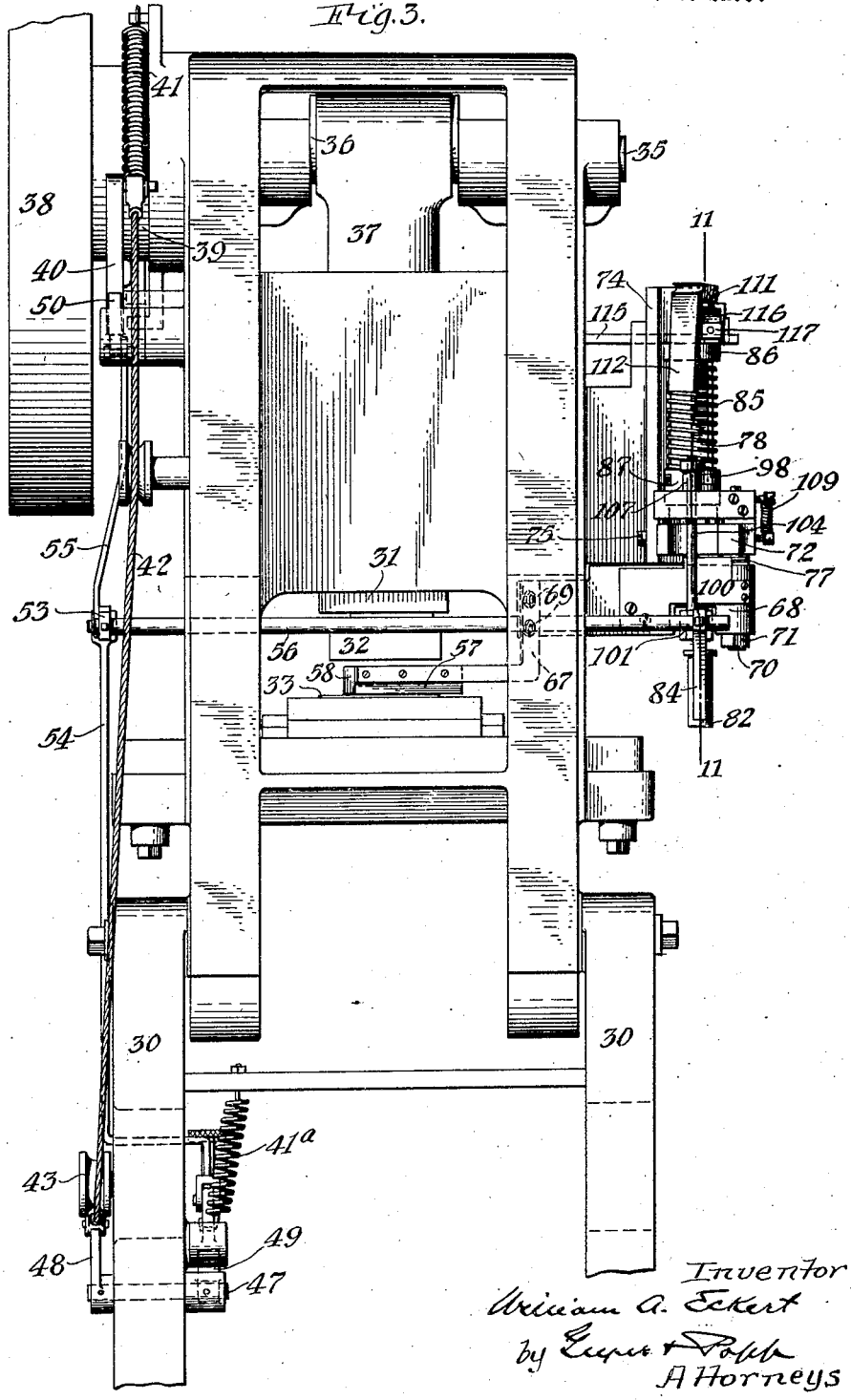

In the accompanying drawings: Figure 1 is a perspective view of a press embodying one form of my invention. Figure 2 is a side elevation of the same. Figure 3 is a rear elevation thereof. Figure 4 is a fragmentary side elevation of the clutch mechanism of the press, showing the position of the parts when the safety device is operated and the clutch is prevented from coupling the movable working tool or punch with the driving mechanism. Figure 5 is a similar view, showing the position of the parts when the clutch is permitted to couple the working tool with the driving mechanism. Figure 6 is a fragmentary vertical section, taken on line 6—6, Fig. 1, showing the position of the guard of the safety device relatively to the punch and die, while the guard is in its fully retracted position and the operator has placed a blank upon the punch. Figure 7 is a similar view, showing the position of the guard relatively to the punch and die when the forward movement of the guard is arrested by striking the hand of the operator which has not yet been withdrawn from between the punch and die. Figure 8 is a similar view, showing the guard in its foremost position, in which it has swung across the path of the punch and surrounds the same, so that the punch can move downwardly into the die without injuring the hand of the operator. Figure 9 is a similar view, on an enlarged scale, showing the front part of the wall of the guard moved forwardly, as indicated by dotted lines, into a position which it would occupy if this front part engaged an obstruction during its backward movement away from the punch and die. Figure 10 is a similar view, showing the front part of the guard wall deflected forwardly for the purpose of clearing the upper end of a blank which has been stamped between the punch and die, and which projects upwardly into the path of this front wall section after the stamping operation has been completed. Figure 11 is a vertical section, on an enlarged scale, taken on line 11—11, Fig. 3, of the cam mechanism whereby the guard is moved forwardly and backwardly into and out of its operative position relatively to the punch and die, and showing the position of the parts when the guard is in its retracted or rearmost position. Figure 12 is a similar view, showing the position of the parts when the guard is in its foremost position. Figures 13, 14, 15, 16, 17 and 18 are fragmentary horizontal sections, taken on the correspondingly numbered lines in Fig. 11. Figure 19 is a fragmentary vertical section taken on line 19—19, Fig. 11. Figure 20 is a perspective view of the tension bar forming part of the means for returning the guard into its rearmost or inoperative position. Figure 21 is a fragmentary perspective view of the guard shifting cam forming part of the safety device, the cam in this instance being shown reverse of the position which it occupies while in use. Figure 22 is a fragmentary vertical section, similar to Figs. 6–10, and showing the manner in which the guard is obstructed in its forward movement when more than one blank is placed upon the die. Figure 23 is a horizontal section of the press, showing a modified form of my invention. Figure 24 is a fragmentary vertical longitudinal section of the same, taken on line 24—24, Fig. 23. Figure 25 is a fragmentary perspective view, showing a modified form of the means for controlling the operation of the clutch which couples the driving mechanism with the means which operate the movable punch or tool of the press.

Similar characters of reference indicate corresponding parts throughout the several views.

Although this safety device is applicable to presses and similar machines which may vary in details of construction, the press which is shown in the drawings, as an example of one suitable for use in connection with my invention, comprises a frame 30, a vertically reciprocating slide 31 guided on the upper part of the main frame and provided at its lower end with a movable tool or punch 32 which is adapted to co-operated with the die 33 for perforating or stamping a blank 34 of sheet metal between the same, a horizontal driving shaft 35 journaled horizontally in the upper part of the main frame and having a crank or eccentric 36 connected by means of a connecting rod 37 with the slide, a pulley 38 mounted on one end of the driving shaft, a clutch 39 adapted to connect and disconnect the driving pulley 38 with the main shaft 35, a vertically-swinging clutch controlling lever 40 which is pivoted on the main frame and which in its uppermost position is adapted to operate the clutch so that it uncouples the driving wheel from the driving shaft, but which in its lowered position operates to couple the driving shaft with the driving wheel, a spring 41 which operates to yieldingly hold the clutch lever 40 in its elevated position, and a pull line 42 which extends downwardly from the clutch lever and around guide wheels 43 and which is adapted to be drawn downwardly by manual means for the purpose of coupling the driving pulley with the driving shaft and causing the punch to move downwardly and upwardly relatively to the die for making an operative stroke of the press. In the lower part of the main frame is mounted a vertically-swinging foot lever 44 which is pivoted at its rear end by means of a pin 45 on the main frame and provided at its front end with a treadle 46 for depressing the same. Heretofore, this foot lever has been connected directly with the lower end of the pull line 42 so that a depression of the same would cause the clutch lever to release the clutch for coupling the driving wheel with the driving shaft and producing an operation of the press. In the present instance, however, this foot lever is not connected directly with the pull line as heretofore, but instead, is connected indirectly therewith in accordance with my invention, as will presently appear. This foot lever is yieldingly held in its elevated position by means of a spring 41ª which connects the same with the main frame, and it is possible to depress this foot lever during the initial part of its downward stroke, without operating the clutch lever 40, but if the same is permitted to complete its downward motion, the last part of this movement is caused to produce a downward pull upon the line 42 which depresses the clutch lever 40 and permits the clutch to couple the driving wheel with the driving shaft and cause the press to operate and effect a working stroke of its punch relatively to the die.

The means whereby the last part of the downward movement of the foot lever is caused to produce a downward pull upon the clutch lever may be varied, but as shown in the drawings, the same comprises a lower horizontal rock shaft 47 which is journaled transversely in the lower part of the main frame, an upper rock arm 48 secured to the outer end of this rock shaft and connected with the lower end of the pull line 42, and a lower rock arm 49 secured to the inner end of the rock shaft 47 and arranged in the path of the foot lever. When the press is idle, and the clutch lever is in its elevated position, the lower rock arm 49 is elevated and the foot lever is arranged a considerable distance above this lower rock arm, as shown by full lines in Figs. 2 and 3. When it is desired to operate the press, the foot lever is depressed but the same moves idly during the first part of this movement from the position indicated by full lines in Fig. 2, to the intermediate position indicated by dotted lines 44ª. During this movement, the clutch lever is not moved downwardly, thereby preventing the driving wheel and driving shaft from being coupled. During this last part of the downward movement of the foot lever from the position shown by dotted lines 44ª to the position shown by dotted lines 44ᵇ, the same engages with the lower rock arm 49 and shifts the latter from the position shown by full lines in Fig. 2 to the position indicated by dotted lines in the same figure, thereby causing the upper rock arm 48 to produce a downward pull upon the operating line 42, whereby the clutch lever, if the same is not otherwise obstructed, will be pulled downwardly and cause the clutch to connect the driving wheel with the driving shaft and produce an operative stroke of the press.

My improved safety device operates to prevent the foot lever from being depressed farther after effecting the first part of its downward motion in the event that an obstruction is present in the path or adjacent to the path of the punch, such as the presence of the hand of the operator over the die, and thereby prevent the foot lever from effecting the last part of its stroke which controls the coupling of the driving wheel and driving shaft and the operation of the press, so that injury to the hand of the operator is prevented.

Although this invention may be embodied in various practical forms, the construction shown in the drawings has been found satisfactory in practice, and is therefore preferred. As there shown, the same is constructed as follows:

50 represents a controlling cam which is pivoted on the main frame by means of a horizontal transverse pin 51 and adapted to be moved into and out of the path of the clutch lever on the lower side of the same. When the press is not in operation and the clutch lever is in its elevated position, so that the clutch is uncoupled, this cam is turned upwardly and engages a flat part 52 of its face with the underside of the clutch lever, as shown by full lines in Fig. 2, whereby this clutch lever is prevented from being depressed and thereby prevents the clutch from being coupled. During the first part of the downward movement of the foot lever, this controlling cam is moved from the position shown in Fig. 2 to the position shown in Fig. 4, but this controlling cam is so constructed that during this movement, the clutch lever is still held in its upper position in which it prevents the clutch from coupling the driving wheel with the driving shaft. This partial turning downward of the controlling cam is effected during the first part of the downward movement of the foot lever. When however the controlling cam is moved downwardly fully into its lowermost position, as indicated in Fig. 5, the same clears the path of the clutch lever and permits the latter to be depressed by the last part of the downward movement of the foot lever, at which time the latter engages with the lower arm 49 of the rock shaft 47 and shifts this arm in a manner previously described. The mechanism for thus transmitting motion from the foot lever to the controlling cam 50 preferably comprises an intermediate rock arm 53 arranged on one side of the main frame and pivotally mounted on the latter. A lower connecting rod 54 connecting the front end of the intermediate rock arm with the foot lever and an upper connecting rod 55 also connecting the front part of the intermediate rock arm with the front part of the controlling cam 50, as shown in Figs. 2 and 3, these connecting rods and rock arm being suitably proportioned and arranged so as to produce the action of the controlling cam upon depressing the foot lever, as just described. The pivot of the rock arm 53 in the present instance, preferably consists of a horizontal intermediate rock shaft 56 which extends transversely through the intermediate part of the main frame and is journaled therein, so that this shaft can co-operate with other parts of the safety mechanism which will be hereinafter described.
Movable horizontally across the path of the punch and the space immediately adjacent to the punch and die, is a guard which is adapted to engage any obstruction which may be present between the punch and die, or adjacent thereto, such as the hand or finger of an operator, or an excess number of blanks which are to be stamped, and be thereby prevented from completing its forward stroke, so that the operation of the press is prevented under these circumstances.

In its preferred form, this guard is constructed in the form of a rectangular frame which, while in its foremost or protecting position, completely surounds the path of the punch and thus prevents a finger or hand of the operator from being inserted between the punch and die after the press starts its operation. This frame-shaped guard preferably comprises a rear section having a rear upright wall 57 and upright end walls 58 adapted to extend across the space in rear of the path of the punch and along opposite lateral sides of the same, and a front section consisting of an upright wall 59 which is preferably of angular form and pivoted at its upper end by means of pins 60 to the end walls of the rear section, so as to enable this front wall section to yield and swing forwardly relatively to the rear wall section in the event that the lower edge of the front wall section should strike an obstruction, such as a burr on the punched article, or some upward projection which may be formed thereon during the process of punching or stamping the same. In Fig. 9, this front wall is represented by dotted lines as swung into a forward position relatively to the rear wall, which position it will take upon striking some obstruction on the upper side of the blank, such as a burr or fin, while moving the guard backwardly over the finished blank. In Fig. 10, the front wall section of the guard is similarly shown moved forwardly relatively to the rear wall section by the upper part 61 of a stamped article which has been shaped or formed between the punch 62 and the lower die 63. This front wall section is preferably held yieldingly in its lowered upright operative position by means of a spring 64 preferably surrounding one of the pivot pins 60 and connected at its opposite ends with the front and rear sections of the guard, as best shown in Figs. 1, 9 and 10.

In order to enable the operator to observe the condition of the work while the guard is surrounding the punch, the front wall of the guard is provided with a sight opening 65 which permits the operator to look through and see the operation of the punch on the blank. In the preferred construction, this opening is covered by a pane 66 of transparent material, such as isinglass, as shown in Fig. 9, whereby the operator is prevented from sticking his finger through this sight opening and injuring it by being caught between the punch and die. In actual practice, it is preferable to have the guard made larger or smaller in dimensions and also shaped more or less to suit the character of the punches and dies with which the same is to be used, in order to enable the guard to fit the punch and die reasonably close and insure the maximum protection against injury to the operator.

In the preferred construction shown in Figs. 1–22, the guard is so mounted that it moves forwardly and backwardly toward and from its operative position relative to the punch and die by an oscillating movement, and for this purpose this guard is provided on one side with an angular arm 67 which is connected with a horizontally swinging shifting arm 68 mounted on the adjacent part of the main frame. The guard arm and the shifting arm are preferably detachably connected by means of bolts 69 or the like, which permits a guard of appropriate shape and size to be mounted on the shifting arm, as best suits the character of the punch and die which are in use, without requiring any alteration in the rest of the mechanism of the safety device. The shifting arm is preferably pivotally supported by means of an upright pivot pin 70 which passes through a vertical opening in the outer end of the shifting arm and is provided at its lower end with a screw nut 71, bearing against the lower side of this arm while its upper end is secured in an opening in the outer end of the bracket arm 72 by means of a set screw 73. This bracket arm projects laterally from a bracket plate 74 which is secured to the adjacent part of the main frame by means of screws 75, as shown or by other suitable means.

In the preferred construction, bearing rollers 76 are interposed between the periphery of the pin 70 and the bore of the respective opening in the shifting arm 68, and a thrust bearing 77 is also interposed between the upper side of the shifting arm and the underside of this bracket arm, as best shown in Fig. 19.

Means are provided whereby this shifting arm is moved forwardly during the initial part of the downward stroke of the foot lever for the purpose of detecting the presence of any obstruction in the path of the punch or adjacent thereto, for preventing the operation of the press in the event that such an obstruction is encountered, which means are so organized that they also operate to return the guard into its rearmost or inoperative position. In the preferred form of the means for actuating the guard, as shown in Figs. 1–21 of the drawings, the same are constructed as follows:

78 represents a vertically movable guard operating cam, the body of which is preferably constructed in the form of an upright cylinder and is provided at its lower end with a cam face 79 which is adapted to engage with an inclined face 80 on the upper side of the guard shifting arm 68, so that upon moving this cam downwardly, this shifting arm will be moved forwardly and carry the guard in a forward direction relatively to the punch and die. This downward movement of the guard operating cam is effected by motion derived from the foot lever through the medium of the means of which the intermediate rock shaft 56, the intermediate rock arm 53, the lower connecting rod 54, the lower rock shaft 47 and the rock arms 48 and 49, form parts, the additional elements consisting of a stem 81 projecting downwardly from the lower end of the guard cam, an adjusting head 82 secured by a screw connection with the lower end of the said stem and provided with a vertical slot 83, and a shifting lever 84 engaging its front end with the slot 83 and connected at its rear end with that end of the rock shaft 56 opposite to which the intermediate rock arm 53 is connected. Such an arrangement of the parts just described would be appropriate when the guard shifting cam 78 and the clutch lever 40 are arranged on opposite sides of the press, as in the present instance, but a somewhat modified arrangement of this mechanism would be necessary in the event that the guard shifting arm 78 is arranged on the same side of press as this clutch lever, as might be necessary or desirable in some forms of presses or to meet some special conditions. When organizing the shifting mechanism in the manner just described, a depression of the foot lever will cause the guard cam to be depressed from the position shown in Fig. 11, to nearly the position shown in Fig. 12, during the first part of the downward movement of the foot lever and before the clutch lever 40 has been pulled downwardly sufficiently to cause the driving clutch to connect the driving wheel or mechanism with the driving shaft for operating the punch of the press.

If, for any reason, the guard is prevented from moving forwardly with a full stroke into its foremost position, as would be the case, for instance, when striking the finger or hand of an operator, which may be between the punch and die or adjacent thereto, then the guard actuating cam 78 would be prevented from moving downwardly a sufficient extent and this would in turn prevent the foot lever from completing the first part of its stroke independently of the clutch controlling lever 40, so that operation of the press would be prevented. When, however, the cam is permitted to move downwardly to such an extent, as will cause the guard shifting arm to be moved forwardly the maximum extent for bringing the guard into its foremost position around the path of the punch, then the guard operating cam is free to continue its downward motion independently of the guard shifting arm 68 during which time the cylindrical surface of the guard operating cam slides downwardly past the rear side of the guard shifting arm, as shown in Fig. 12. During this continued movement of the guard operating cam and associated parts, the foot lever effects the last part of its downward stroke and causes a downward pull upon the clutch lever 40, so that the driving clutch will couple the driving wheel with the driving shaft and produce an operation of the press. During such continued downward movement of the guard operating cam, the guard is held in its forward movement and prevented from moving backwardly by reason of the engagement of the guard shifting arm 68 with the front side of the guard operating cam 78, as shown in Fig. 12, thereby preventing interference of the guard with the free movement of the punch and also preventing the operator from shifting the guard into a position in which the punch would not be protected, thus avoiding injury to the operator if he should attempt to interfere with the proper operation of the device. Upon releasing the foot pressure on the foot lever, the latter will be raised by the spring 41ª and the guard cam will be simultaneously raised by means of a spring 85 which preferably surrounds the upper part of the guard cam and engages its lower end with a support while its upper end bears against a cap 86 which is secured to the upper end of the guard cam. The foot lever spring 41ª and the guard cam spring 85 by their resilience operate to return the parts associated therewith to their retracted position and after the foot lever has effected the initial part of its upward movement and is effecting the last part of the upward movement, the spring 41 operates to move the clutch lever 40 into its elevated position in which it operates to uncouple the driving clutch, so as to disconnect the driving wheel from the driving shaft at the end of the respective cycle of operations of the press.

When operating with dies and punches which extend fore and aft of the press different distances, it is desired to change the length of throw of the guard fore and aft of the machine accordingly, in order to obtain the maximum speed and output of the machine, it being obvious that a co-operating punch and die which is comparatively narrow fore and aft of the machine would require a shorter throw than a co-operating punch and die which is comparatively long in this direction of the machine. For this purpose, means are provided which will permit of readily adjusting the throw of the guard in accordance with the character, shape and width of the die and punch which are used for a particular job. This is preferably accomplished by providing the guard operating cam with a cam face, different parts of which are of different length, so that upon adjusting this cam for engaging different parts of its cam face with the guard shifting arm, the latter will be thrown different distances fore and aft of the machine, depending upon what particular part of the cam face is engaged with this arm. In the preferred construction, this is accomplished by constructing the cam face 79 of the guard operating cam in the form of a cone, the center of which is eccentric to or on one side of the axis of the body of this cam, as shown in Figs. 11, 12 and 21. It follows from this construction that when this cam is turned about its longitudinal axis, so as to present the shortest side of its conical cam face to the guard shifting arm, as shown in Figs. 11 and 12, the minimum throw of this cam will be exerted upon the guard shifting arm. Upon turning the guard operating cam half way round, so that the longest part of its cam face engages with the guard shifting arm, then the latter will be thrown the greatest possible extent by the respective part of this cam face. In like manner, this cam may be turned into a position in which some part thereof intermediate of the shortest portion and the longest portion of its cam face will engage with the guard shifting arm, whereby the latter will be moved an extent proportionate to the particular part of the cam face which is in the operative position. In such a construction, the stem which connects this guard cam with the shifting head preferably extends downwardly from the apex of the cone, as shown in Figs. 11, 12 and 21. Various means may be provided for guiding the guard operating cam and also adjusting the same circumferentially for the purpose of engaging different parts of this conical cam face with the guard shifting arm, but the means which are shown in the drawings are approved, and as there shown the same comprise a guide collar or sleeve 87 which surrounds the lower part of the guard operating cam so as to form a bearing therefor in which the cam both slides and rotates, which collar or sleeve is in turn journaled in a bearing 88 in the adjacent outer part of the bracket arm 72, as shown in Figs. 11 and 12. This sleeve or collar is held against longitudinal movement by means of a circumferential flange 89 formed thereon and resting against the upper side of the bracket arm 72, and a retaining finger 90 secured to this bracket arm and engaging with the upper side of this flange, as shown in Figs. 11, 12, 13, 15 and 16. The upper end of this sleeve forms a seat or shoulder for supporting the lower end of the spring 85 which raises the guard cam. The guard cam and the guide sleeve 87 are compelled to turn together, but this cam is free to move vertically independently of this sleeve by means of a spline 91 secured to the bore of this sleeve and engaging with a flattened face or keyway 92 on the periphery of this cam, as shown in Figs. 11, 12, 14 and 15. Means suitable for adjusting the guard cam circumferentially into different positions and holding the same in place consist of a plurality of openings 93 arranged in a circumferential row on the upper part of the sleeve 87 and adapted to receive a suitable tool for turning the same, and a locking dog 94 movable into and out of engagement with one or another of a circumferential row of notches 95 in the periphery of the flange 89 and movably secured to the bracket arm 72 by means of a screw 96 which passes through a longitudinal slot 97 in this locking dog, as best shown in Figs. 11-16. For convenience in selecting the particular part of the guard operating cam in order to secure a throwing effect of the desired length upon the guard, the upper part of the periphery of the guide sleeve or collar is provided with an annular row or number of location marks 98, one or the other of which may be shifted into line with a stationary mark, such for instance as the mark 99 at the upper end of the pivot pin 70, thereby enabling the operator to quickly, conveniently and reliably adjust the throw of the guard operating cam to suit a particular requirement.

In order to prevent the guard from being thrown forwardly too far but insuring centering of the same relatively to the punch and die when in its forward position, a stop device is provided which preferably consists of a stop strap or loop 100 secured to the rear side of the guard shifting arm and adapted to engage with the rear side of the guard operating cam, as shown in Figs. 12 and 17, the rearward throw of the guard being arrested by engagement with the front side of the stem on the guard cam, as shown in Fig. 11, thereby controlling both the forward and backward movements of the guard.

In order to cause the guard to move promptly into its rearmost position when the same is released, a spring tension or return device is provided which is so constructed that it will operate effectively in conjunction with the guard operating cam regardless of whether a short or long part of its cam face engages with the guard shifting arm, this device being also so organized that the guard shifting arm will be free to swing about its pivot and change its position relatively to the face of the guard operating cam without producing any binding between these parts. This guard return device in its preferred form, as shown in Figs. 1, 11, 12, 13, 18, 19 and 20, preferably comprises a tension bar 101 which is mounted on the stem of the guard cam so as to be capable of oscillating horizontally and also sliding vertically thereon and provided on its upper side in front of the stem with an inclined bearing face 102 which engages with a correspondingly inclined bearing face 103 on the lower side of the guard shifting arm 68, as shown in Figs. 11 and 12. In rear of the stem this tension bar is provided with an upwardly projecting rod 104, the upper end of which passes through a longitudinal slot 105 formed on the inner arm of a tension lever 106 pivoted on the upper side of the bracket arm 72. At its upper end the rod 104 is provided with a stop adapted to engage with the top of the tension lever, this stop in its preferred form consisting of a lower sleeve 107 screwed on this end of the rod 104, and a clamping nut 108 applied to this rod and engaging with the upper end of the sleeve 107, as shown in Figs. 11 and 12. The outer arm of the tension lever 106 is connected by means of a spring 109 with the adjacent part of the bracket arm, as shown in Figs. 1, 3 and 13, whereby this lever is caused to produce a tension or pull upon the rear end of the tension bar which equalizes the tension upon the front end of the tension bar when the latter is moving upwardly. In the elevated position of the guard cam, the upper end of the head 82 on this stem bears against the lower side of the tension bar and holds the guard shifting arm against the front side of the stem, as shown in Fig. 11. As the guard operating cam during its descent pushes the guard shifting arm forwardly, the tension bar due to the wedging action between the same and the guard shifting arm is moved downwardly the requisite extent to permit the guard shifting arm to move forwardly under the action of the guard cam, as shown in Fig. 12. The downward movement of this tension bar is limted by engagement of the stop sleeve 107 with the upper side of the tension lever, as shown in Fig. 12, which position can be adjusted to suit different adjusted positions and the effective throw of the guard by running an adjusting sleeve 107 up or down on the rod, as required. During the subsequent upward movement of the guard cam 78, the adjusting head 82 at the lower end of the stem 81 engages with the underside of the tension bar and lifts the same into its uppermost position, whereby the inclined face of this bar by engaging with the underside of the guard shifting arm will again move the latter backwarly against the stem of the guard cam, as shown in Fig. 11. In order to avoid undue noise and wear as the shifting head 82 on the cam stem engages with the tension bar, a cushion is interposed between this head and the tension bar which in the preferred construction consists of a washer 110 of rubber or similar resilient material which is adapted to engage with the underside of the tension bar in its uppermost position, as shown in Fig. 11.

Locking means are provided for holding the guard positively in its foremost position around the punch while the latter is descending and also for such an additional time as may be required to permit the punch to ascend, after the punching operation, a sufficient distance to clear the uppermost part of the guard and thereby avoid interference between these movable parts of the machine. The preferred means for this purpose are constructed as follows:

Pivotally mounted on the upper part of the bracket plate by a pin 111, is a locking or detent latch or dog 112 of angular form which is capable of swinging vertically and provided on its lower part with a locking nose or shoulder 113 adapted to engage with the edge of the cap 86 at the upper end of the guard operating cam. Between its extremities, this locking catch or dog is provided with a trip or releasing lug or shoulder 114 which faces forwardly. Secured to the front side of the vertically movable slide 31 of the stamping press is a laterally projecting supporting arm 115 on the free end of which is mounted an L-shaped carrier, the lower vertical member 116 of which is capable of vertical adjustment on the arm 115 by means of a clamp 117 secured to this arm and passing through a vertical slot 118 in the vertical part of this carrier. The upper horizontal member 119 of this carrier is provided at its rear end with a trip pawl 120 which is pivoted thereto by a pin 121 so as to be capable of swinging vertically from a horizontal position into an upwardly inclined position, but is prevented by means of a stop 122 on this carrier from swinging below a horizontal position. When the guard operating cam is moved into its lowermost position, the locking dog 112 is shifted by gravity into a position in which it engages its lower or locking nose with the upper edge of the cap on the guard cam, as shown in Fig. 12. While the guard cam is effecting this movement, the carrier 116, 119, remains in its elevated position with its trip pawl arranged above the trip lug on the locking pawl, as shown by full lines in Fig. 12. During the first part of the subsequent downward movement of the press slide carrying the punch, the trip pawl 120 is shifted from the horizontal position shown by full lines in Fig. 12 to the inclined position show by dotted lines in the same figure, whereby this trip pawl is permitted to clear the locking lug on the detent dog, and the locking dog is permitted to remain in engagement with the cap on the upper end of the guard operating cam and the punch carrying slide is free to descend. During the first part of the subsequent upward movement of the punch, and until such time as the punch has cleared the upper end of the guard, the latter is held in its forward position around the path of the punch by engagement of the detent or locking dog 112 with the upper end of the guard operating cam. During the last part of the upward movement of the punch carrying slide, however, the trip pawl 120, which is now held rigid in a horizontal position, engages with the trip or releasing lug 114 of the locking dog and pushes the same rearwardly from the position shown by full lines in Fig. 12 to the position shown by dotted lines in Fig. 11, thereby disengaging the locking dog from the guard operating cam and permitting the latter to be raised by the resilience of its spring 85. During the last part of the upward movement of the carrier 116, 119 with the punch and associated parts, the trip pawl 120 passes above the releasing lug 114 and permits the locking dog 112 to swing inwardly toward the guard operating cam, so that the latter is in a position to automatically re-engage its nose with the upper and of the guard operating cam and the releasing lug 114 is arranged below the trip pawl, as shown in full lines in Fig. 11.

Instead of mounting the guard directly on the guard shifting arm, as shown in Figs. 1, 2 and 3, this guard may be mounted on a slide 123 which moves horizontally and lengthwise in guideways 124 carried by the main frame in rear of the punch and die, and motion may be transmitted to this slide from the guard shifting arm 68 by means of an arm extension 125 secured to the guard shifting arm and provided at its free end with a slot 126 which receives a bolt or pin 127 on the guard carrying slide, as shown in Figs. 23 and 24.

If desired, other forms of clutches may also be employed for connecting and disconnecting the driving wheel or mechanism with the driving shaft instead of the one which is shown in Fig. 2. For instance, a longitudinally movable clutch bar 128 may be employed for controlling the driving clutch, which bar slides in a guide 129 and is yieldingly held in its elevated position by a spring 130 and adapted to be pulled downwardly by means of a member or line 131 connecting the same with the upper rock arm 48 of the treadle mechanism, as shown in Fig. 25. In this construction, the clutch pin 128 is held in its elevated operative position by means of a locking detent dog 132 which is pivoted on and adjacent part of the main frame and provided with a locking nose 133 adapted to engage with a notch 134 in the clutch bar and also provided with a crank 135 which is connected by means of a connecting rod 136 with the intermediate rock lever 53, similar to the manner in which the controlling cam 50 is connected with this same rock arm.

Obviously, this device will not only safeguard the operator and prevent the fingers or hands from being injured, but the same also operates as a detector in case there are any other obstructions or abnormal conditions present in the machine, such for instance as when an excessive number of blanks are placed upon the die. An example of this kind is shown in Fig. 22, in which two blanks 137, 137 are shown on the die in place of one. By arranging the guard low enough so that it will just clear the top of one blank but strike the rear edge of a superposed excess blank, this will operate to prevent the guard from moving forwardly if this excess blank should either be stuck on the normal lower blank or be held there by hand, and thereby prevent the press from operating and serve as a notice to the operator that something is wrong which requires correction before the press can proceed in its normal operation. This device therefore not only safeguards the operator, but it also avoids possible waste of material as well as injury to the machine which would be liable to occur when operating upon more than one blank at a time.

As a whole, this safety device is very reliable and efficient in operation, it positively prevents injury to the operator, it can be quickly adjusted to suit tools of different sizes, and it can be readily installed on all presses of standard construction without any alteration in its parts.

I claim as my invention:

1. A safety device for a press having a movable working tool and manually operated means for controlling the operation of said tool comprising a detector adapted to move relatively to the path of said working tool, an arm operatively connected with said detector and having a forward and backward movement, a cam having a cam face adapted to engage said arm and constructed to produce effective throws of varying length and adapted to be adjusted for bringing different parts of its cam face into engagement with said arm, and means for moving the cam in the direction for causing the same to shift said arm for moving said detector forwardly.

2. A safety device for a press having a movable working tool and manually operated means for controlling the operation of said tool comprising a detector adapted to move relatively to the path of said working tool, an arm operatively connected with said detector and having a forward and backward movement, a longitudinally reciprocating cam which is provided with an eccentric conical face different parts of which produce effective throws of varying length and which is adapted to be turned for engaging different parts of its face with said arm, and means for moving said cam in the direction for causing the same to shift said arm for moving said detector forwardly.

3. A safety device for a press having a movable working tool and manually operated means for controlling the operation of said tool comprising a detector adapted to move relatively to the path of said working tool, an arm operatively connected with said detector and having a forward and backward movement, a longitudinally reciprocating cam which is provided with an eccentric conical face different parts of which produce effective throws of varying length and which is adapted to be turned for engaging different parts of its face with said arm, manually operated means for moving said cam in the direction for causing the same to shift said arm forwardly, and automatic means for moving said cam in the opposite direction.

4. A safety device for a press having a movable working tool and manually operated means for controlling the operation of said tool, comprising a detector adapted to move relatively to the path of said working tool, an arm operatively connected with said detector and having a forward and backward movement, a longitudinally reciprocating cam which is provided with an eccentric conical face different parts of which produce effective throws of varying length and which is adapted to be turned for engaging different parts of its face with said arm, means for adjusting said cam about its longitudinal axis, and means for moving said cam in the direction for causing the same to shift said arm for moving said detector forwardly.

5. A safety device for a press having a movable working tool and manually operated means for controlling the operation of said tool comprising a detector adapted to move relatively to the path of said working tool, an arm operatively connected with said detector and having a forward and backward movement, a longitudinally reciprocating cam which is provided with an eccentric conical face different parts of which produce effective throws of varying length and which is adapted to be turned for engaging different parts of its face with said arm, means for adjusting said cam about its longitudinal axis comprising a collar arranged on the cam having a circumferential row of notches and a dog mounted on a stationary part and adapted to be engaged with one or another of said notches.

6. A safety device for a press having a movable working tool and manually operated means for controlling the operation of said tool comprising a detector adapted to move relatively to the path of said working tool, an arm operatively connected with said detector and having a forward and backward movement, a longitudinally reciprocating cam which is provided with an eccentric conical face different parts of which produce effective throws of varying length and which is adapted to be turned for engaging different parts of its face with said arm, means for adjusting said cam about its longitudinal axis comprising a collar capable of turning with said cam but held against moving lengthwise therewith and provided with a circumferential row of notches, a bracket provided with a bearing in which said collar is journaled, and a dog movably mounted on said bracket and adapted to be engaged with one or another of said notches, and means for moving said cam in the direction for causing the same to shift said arm for moving said detector forwardly.

7. A safety device for a press having a movable working tool and manually operated means for controlling the operation of said tool comprising a detector adapted to move relatively to the path of said working tool, an arm operatively connected with said detector and having a forward and backward movement, a longitudinally reciprocating cam which is provided with an eccentric conical face different parts of which produce effective throws of varying length and which is adapted to be turned for engaging different parts of its face with said arm, means for adjusting said cam about its longitudinal axis comprising a collar capable of turning with said cam but held against moving lengthwise therewith and provided with a circumferential row of notches, a bracket provided with a bearing in which said collar is journaled, and a dog movably mounted on said bracket and adapted to be engaged with one or another of said notches, manually operated means for moving said cam lengthwise in the direction for causing the same to move said arm forwardly, and automatic means in the reverse direction moving said cam comprising a spring surrounding the cam and bearing at one end against said collar, and a cap which is secured to said cam and against which the other end of said spring bears.

8. A safety device for a press having a movable working tool and manually operated means for controlling the operation of said tool comprising a detector adapted to move relatively to the path of said working tool, an arm operatively connected with said detector and having a forward and backward movement, a cam adapted to engage said arm for moving the same forwardly, manually operated means for moving said cam in the direction for engaging said arm, automatic means for moving said cam in the opposite direction, detent means for locking the cam in position after the latter has moved said arm forwardly, and a releasing means for disengaging said detent means from said cam during the return stroke of said tool.

9. A safety device for a press having a movable working tool and manually operated means for controlling the operation of said tool comprising a detector adapted to move relatively to the path of said working tool, an arm operatively connected with said detector and having a forward and backward movement, a cam adapted to engage said arm for moving the same forwardly, manually operated means for moving said cam in the direction for engaging said arm, automatic means for moving said cam in the opposite direction, detent means for locking the cam in position after the latter has moved said arm forwardly, comprising a detent pawl having a nose adapted to engage with a part on the upper end of said cam at the end of the downward movement of the latter and also having a releasing lug, and a releasing arm moving vertically with said tool and having a dog which is mounted thereon so that it is loose on the releasing arm during the downward movement of the same with the tool and trips past said releasing lug but is rigid thereon during the upward movement of the same with the tool and releases the detent pawl from said cam by engaging said releasing lug during the last part of the upward movement of said tool.

10. A safety device for a press having a movable working tool and manually operated means for controlling the operation of said tool comprising a detector adapted to move relatively to the path of said working tool, an arm operatively connected with said detector and having a forward and backward movement, a vertically reciprocating cam having a cam face adapted to engage said arm for moving the same forwardly, and a tension device for holding said arm yieldingly in engagement with said cam and moving said arm backwardly, comprising a tension bar, and a spring device for holding said tension bar yieldingly in engagement with said arm, said arm having an upper inclined face which engages said cam and also having a lower inclined face, and said tension bar having an inclined face engaging with the lower inclined face of said arm.

11. A safety device for a press having a movable working tool and manually operated means for controlling the operation of said tool comprising a detector adapted to move relatively to the path of said working tool, an arm operatively connected with said detector and having a forward and backward movement, a vertically reciprocating cam capable of adjustment about its axis and having a lower eccentric conical cam face which engages the upper side of said arm, a tension bar pivotally mounted on the lower end of said cam and provided with an inclined face engaging the underside of said arm, and spring means for yieldingly holding said tension bar in its working position.

12. A safety device for a press having a movable working tool and manually operated means for controlling the operation of said tool comprising a detector adapted to move relatively to the path of said working tool, an arm operatively connected with said detector and having a forward and backward movement, a vertically reciprocating cam capable of adjustment about its axis and having a lower eccentric conical cam face which engages the upper side of said arm, a tension bar pivotally mounted on the lower end of said cam and provided on its front end with an incline engaging with the underside of said arm, and a spring device connected with the rear end of said bar for equalizing the tension on the front end of the same.

13. A safety device for a press having a movable working tool and manually operated means for controlling the operation of said tool comprising a detector adapted to move relatively to the path of said working tool, an arm operatively connected with said detector and having a forward and backward movement, a vertically reciprocating cam capable of adjustment about its axis and having a lower eccentric conical cam face which engages the upper side of said arm, a tension bar pivotally mounted on the lower end of said cam and provided on its front end with an incline engaging with the underside of said arm, and a spring device for turning the tension bar comprising an upright rod connected with said bar, a tension lever having one arm connected with said rod, and a spring connected with the other arm of said tension lever.

14. A safety device for a press having a movable working tool and manually operated means for controlling the operation of said tool comprising a detector adapted to move relatively to the path of said working tool, an arm operatively connected with said detector and having a forward and backward movement, a vertically reciprocating cam capable of adjustment about its axis and having a lower eccentric conical cam face which engages the upper side of said arm, a tension bar pivotally mounted on the lower end of said cam and provided on its front end with an incline engaging with the underside of said arm, and a spring device for turning the tension bar comprising an upright rod connected with said bar, a tension lever having one arm provided with a slot which receives said rod, and a spring connected with the other arm of said tension lever.

15. A safety device for a press having a movable working tool and manually operated means for controlling the operation of said tool comprising a detector adapted to move relatively to the path of said working tool, an arm operatively connected with said detector and having a forward and backward movement, a vertically reciprocating cam provided at its lower end with a cam face engaging with said arm and also provided with a depending stem, a vertically movable depressing lever connected with said stem, and means for cushioning the upward movement of said cam.

16. A safety device for a press having a movable working tool and manually operated means for controlling the operation of said tool comprising a detector adapted to move relatively to the path of said working tool, an arm operatively connected with said detector and having a forward and backward movement, a vertically reciprocating cam provided at its lower end with a cam face engaging with said arm and also provided with a depending stem, a vertically movable depressing lever connected with said stem, a tension bar mounted on said stem and having an incline engaging with the underside of said arm, spring means for turning said tension bar, and a cushion interposed between the lower part of said stem and said tension bar.

17. A safety device for a press having a movable working tool, comprising a guard adapted to move relatively to the path of said tool and having a wall portion which will yield upon encountering an obstruction during its return movement.

18. A safety device for a press having a movable working tool, comprising a guard adapted to move relatively to the path of said tool and having a frame shaped wall which is adapted to surround the path of said tool and has a main rear part, and a front part pivoted to swing vertically on said rear part.

19. A safety device for a press having a movable working tool, comprising a guard adapted to move relatively to the path of said tool and having a frame shaped wall which is adapted to surround the path of said tool and has a main rear part, a front part pivoted to swing vertically on said rear part, and a spring for holding said front part yieldingly in its depressed normal position.

20. A safety device for a press having a movable working tool, comprising a guard adapted to move relatively to the path of said tool, means for operating said tool including a clutch having a clutch controlling lever, a rotary cam adapted during the first part of its forward rotation to prevent said lever from moving but during the last part of its rotation to permit said lever to turn, a foot lever, means for holding said foot lever yieldingly in its elevated position, a connection between said cam and said foot lever, means which are unaffected by the foot lever during the first part of its downward movement but which are engaged by and actuate said clutch lever during the last part of the downward movement of said foot lever, and means for moving the guard forwardly into its operative position during the first part of the downward movement of said foot lever.

21. A safety device for a press having a movable working tool, comprising a guard adapted to move relatively to the path of said tool, means for operating said tool including a clutch having a clutch controlling lever, a rotary cam adapted during the first part of its forward rotation to prevent said lever from moving but during the last part of its rotation to permit said lever to turn, a foot lever, means for holding said foot lever yieldingly in its elevated position, a connection between said cam and said foot lever, comprising an intermediate rock arm, and upper rod connecting said intermediate rock arm and cam and a lower rod connecting said intermediate rock arm and foot lever, a lower rock shaft provided with an upper arm connected with said clutch lever and a lower arm arranged below the foot lever, said intermediate rock shaft being operatively associated with said guard for moving the same forwardly during the first part of the downward movement of said foot lever.

WILLIAM A. ECKERT.